US011543936B2

(12) United States Patent
Vairamohan (10) Patent No.: US 11,543,936 B2
(45) Date of Patent: Jan. 3, 2023

(54) TAKING BULK ACTIONS ON ITEMS IN A USER INTERFACE (71) Applicant: AirWatch LLC, Atlanta, GA (US)

(72) Inventor: Rohit Vairamohan, Atlanta, GA (US)

(73) Assignee: AirWatch LLC, Atlanta, GA (US)

(*) Notice: Subject to any disclaimer, the term of this patent is extended or adjusted under 35 U.S.C. 154(b) by 662 days.

(21) Appl. No.: 15/184,679

(22) Filed: Jun. 16, 2016

(65) Prior Publication Data

US 2017/0364213 A1 Dec. 21, 2017

(51) Int. Cl.
| | |
|---|---|
| *G06F 3/0482* | (2013.01) |
| *H04L 67/30* | (2022.01) |
| *G06F 7/08* | (2006.01) |
| *G06F 3/04883* | (2022.01) |
| *H04L 51/42* | (2022.01) |
| *H04L 51/216* | (2022.01) |
| *H04L 67/55* | (2022.01) |
| *H04L 67/01* | (2022.01) |

(52) U.S. Cl.
CPC ........ *G06F 3/0482* (2013.01); *G06F 3/04883* (2013.01); *G06F 7/08* (2013.01); *H04L 51/216* (2022.05); *H04L 51/42* (2022.05); *H04L 67/30* (2013.01); *H04L 67/55* (2022.05); *H04L 67/01* (2022.05)

(58) Field of Classification Search
CPC ...... G06F 3/0482; G06F 3/04883; G06F 7/08; H04L 67/30; H04L 67/26; H04L 51/22; H04L 51/16; H04L 67/42
See application file for complete search history.

(56) References Cited

U.S. PATENT DOCUMENTS

| | | |
|---|---|---|
| D597,101 S | 7/2009 | Chaudhri et al. |
| D633,920 S | 3/2011 | Luke et al. |
| D648,344 S | 11/2011 | Arnold |
| D658,678 S | 5/2012 | Gleasman et al. |
| D681,044 S | 4/2013 | Sakata |
| D690,317 S | 9/2013 | Hemeon et al. |
| D695,781 S | 12/2013 | Edwards et al. |
| D699,743 S | 2/2014 | Arnold et al. |
| D699,744 S | 2/2014 | Ho Kushner et al. |
| D703,691 S | 4/2014 | Brinda et al. |
| D709,901 S | 7/2014 | Landis et al. |
| D710,878 S | 8/2014 | Jung |
| D716,338 S | 10/2014 | Lee |
| D717,817 S | 11/2014 | Yu et al. |
| D719,582 S | 12/2014 | Frew et al. |

(Continued)

OTHER PUBLICATIONS

Office Action for U.S. Appl. No. 29/575,057 dated Oct. 30, 2017.

(Continued)

*Primary Examiner* — Jennifer N Welch
*Assistant Examiner* — Ashley M Fortino
(74) *Attorney, Agent, or Firm* — Thomas | Horstemeyer, LLP (57) ABSTRACT

Disclosed are various approaches for generating a user interface in which data items are grouped together. Additionally, a bulk action can be taken by a user on a grouping of data items within the user interface. An example of such a user interface can be within an email client used to manage email messages. Email messages can be grouped according to a grouping factor and a bulk action can be taken on a grouping from within the user interface.

23 Claims, 7 Drawing Sheets

(56) References Cited

U.S. PATENT DOCUMENTS

| | | |
|---|---|---|
| 8,935,631 B2 | 1/2015 | Leonard et al. |
| D729,271 S | 5/2015 | Zhang et al. |
| D730,382 S | 5/2015 | Brinda et al. |
| D731,524 S | 6/2015 | Brinda et al. |
| D732,073 S | 6/2015 | Adams |
| D736,246 S | 8/2015 | Zhang et al. |
| D738,394 S | 9/2015 | Chaudhri et al. |
| D738,908 S | 9/2015 | Herold et al. |
| D741,897 S | 10/2015 | Wilkinson et al. |
| D745,020 S | 12/2015 | Mariet et al. |
| D745,038 S | 12/2015 | Abbas |
| D746,858 S | 1/2016 | Vogt |
| D749,622 S | 2/2016 | Chaudhri et al. |
| D750,097 S | 2/2016 | Kim et al. |
| D753,140 S | 4/2016 | Kouvas et al. |
| D753,699 S | 4/2016 | Tsukamoto |
| D754,169 S | 4/2016 | Kaplan |
| D757,044 S | 5/2016 | Ostrowski et al. |
| D757,086 S | 5/2016 | Kang |
| D758,420 S | 6/2016 | Zhou |
| D758,446 S | 6/2016 | Lv et al. |
| D759,687 S | 6/2016 | Chang et al. |
| D760,732 S | 7/2016 | Sakai et al. |
| D762,671 S | 8/2016 | Chan et al. |
| D762,683 S | 8/2016 | Eom et al. |
| D762,685 S | 8/2016 | Eom et al. |
| D768,180 S | 10/2016 | Chaudhri et al. |
| D769,280 S | 10/2016 | Bae et al. |
| D771,701 S | 11/2016 | Ostrowski et al. |
| D771,702 S | 11/2016 | Ostrowski et al. |
| D772,292 S | 11/2016 | Ostrowski et al. |
| D773,481 S | 12/2016 | Everette et al. |
| D776,692 S | 1/2017 | Armstrong |
| D778,939 S | 2/2017 | Caro et al. |
| D780,801 S | 3/2017 | Jann et al. |
| D783,648 S | 4/2017 | Vazquez et al. |
| D793,424 S | 8/2017 | Bao et al. |
| D794,045 S | 8/2017 | Akana et al. |
| D795,281 S | 8/2017 | Kim et al. |
| D797,133 S | 9/2017 | Marcolongo et al. |
| D801,362 S | 10/2017 | Wang et al. |
| D804,521 S | 12/2017 | Deets, Jr. |
| D804,522 S | 12/2017 | Sachtleben et al. |
| D806,717 S | 1/2018 | Bae et al. |
| D808,413 S | 1/2018 | Wu et al. |
| D809,003 S | 1/2018 | Sowden et al. |
| D816,110 S | 4/2018 | Choi et al. |
| D817,975 S | 5/2018 | Kim et al. |
| D820,880 S | 6/2018 | Vairamohan |
| 10,025,459 B2 | 7/2018 | Eye et al. |
| D827,657 S | 9/2018 | Cuebas et al. |
| D830,373 S | 10/2018 | Gupta et al. |
| D847,831 S | 5/2019 | Alvarez et al. |
| D847,855 S | 5/2019 | Majernik et al. |
| D848,458 S | 5/2019 | Rocha et al. |
| 2010/0295805 A1 | 11/2010 | Shin et al. |
| 2010/0299599 A1 | 11/2010 | Shin et al. |
| 2011/0252349 A1* | 10/2011 | Chaudhri ............ G06F 3/04817 715/769 |
| 2013/0033525 A1 | 2/2013 | Markiewicz et al. |
| 2013/0067420 A1* | 3/2013 | Pittappilly ............ G06F 3/0236 715/863 |
| 2013/0145366 A1 | 6/2013 | Newell et al. |
| 2013/0185650 A1 | 7/2013 | Gutowitz |
| 2014/0033032 A1 | 1/2014 | Reynolds et al. |
| 2014/0115455 A1 | 4/2014 | Kim |
| 2014/0143683 A1 | 5/2014 | Underwood et al. |
| 2014/0223347 A1 | 8/2014 | Seo et al. |
| 2014/0280616 A1* | 9/2014 | Ramanathan ........... H04L 51/22 709/206 |
| 2014/0282243 A1* | 9/2014 | Eye ...................... G06F 3/0482 715/810 |
| 2015/0046828 A1 | 2/2015 | Desai et al. |
| 2015/0067582 A1 | 3/2015 | Donnelly et al. |
| 2015/0339373 A1* | 11/2015 | Carlson ............. G06F 17/30601 707/737 |
| 2017/0277382 A1 | 9/2017 | Guo |
| 2017/0278069 A1 | 9/2017 | Guo |
| 2017/0364213 A1 | 12/2017 | Vairamohan |

OTHER PUBLICATIONS

Riley, Kaylee. "Proctrasinators Seek Help Before the Last Minute." theaviso.org. Feb. 12, 2013. Accessed Oct. 25, 2017. Available online at URL: <htlp://theaviso.org/2013/02/12/procrastinators-seek-help-before-the-last-minute/>.

"Learn Future Events." mobilemonitor.com, accessed and date retrieved via Internet Archive Wayback Machine. Available Jan. 24, 2012. Accessed Oct. 25, 2017. Available online via URL: <https://web.archive.org/web/20120124061621/htlp://www.mobilemonitor.com/features/events-calendar>.

Chalvet, Barthelemy. "Calendar Modal." dribbble.com Sep. 30, 2013. Accessed Oct. 25, 2017. Available online at URL: <https://dribbble.com/shots/1254349-Calendar-Modal>.

Office Action dated Jul. 27, 2017 for U.S. Appl. No. 29/575,056.
Notice of Allowance dated Feb. 20, 2018 for U.S. Appl. No. 29/575,056.
Office Action mailed for U.S. Appl. No. 15/597,716.
Notice of Allowance mailed for U.S. Appl. No. 15/597,716.
Office Action mailed for U.S. Appl. No. 29/648,086.
Office Action mailed for U.S. Appl. No. 16/036,046.

* cited by examiner

TAKING BULK ACTIONS ON ITEMS IN A USER INTERFACE

BACKGROUND

Users within an enterprise can be inundated with email messages. A user might have multiple email accounts across multiple organizations, work and personal, that can contribute to a deluge of email messages. Users might devote considerable time and resources to processing these email messages. In other words, users have to invest time to determine what the context of each email is and then determine an action in response to the email. For example, the user might wish to delete or archive the message, forward the message, flag the message, or take other actions with respect to the email.

The problem can be exacerbated when a user is away from his or her email or fails to process his or her email inbox after a longer period of time. For example, a user that is on vacation for a week returns to a week's worth of email messages that might require action. Additionally, some users might wish to keep their inboxes clean of old or stale email messages so that they can view and attend to recently received emails that might require immediate attention.

Email clients often require a user to take an action on individual email messages, particularly in a mobile context. In some contexts, users can individually select email messages and perform an action on the selected email messages, but the messages must still be individually selected. Accordingly, there remains a problem with users having to touch of interact with individual messages to perform actions, which can be overwhelming in environments where users are dealing with large volumes or email, which is a scenario that is becoming more and more prevalent.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a client application that facilitates bulk actions on groupings of items, such as email messages, calendar entries, contacts, or other data items. For example, an email client can present a user interface in which a user's email inbox or other folders associated with the user account is displayed. The user interface can display email messages received by the user and, in some cases, allow the user to sort the email messages by date, subject, sender, or other parameters of the email messages. However, as users are becoming more and more inundated with email messages, users are forced to devote more and more time to processing or dealing with email messages.

For example, if a user has been away from his or her email for a period of time, he or she might return to find his or her email inbox filled with numerous unread emails. Accordingly, the user might be forced to process each email in the inbox individually, which can consume a lot of the user's time. In one scenario, the user might wish to delete or archive all email messages that were received during his or her vacation or that are older than a certain date. In prior art email clients, the user might be forced to individually select the email messages for archival or deletion. In some email clients, the user might able to perform a bulk archival or deletion of multiple email messages but might still be forced to select email messages individually to perform a bulk action on the emails.

In other scenarios, users might also avoid processing emails in their inboxes to avoid having to invest the time in individually archiving, deleting, flagging, or otherwise processing emails in their inboxes. In one scenario, a user might simply avoid processing emails that are from a particular user, tagged with a particular tag or folder identifier, or older than a certain date from the present date. However, by employing this methodology of email management, the user's inbox might become overflowing with email messages that the user has no intention of reading, filing or touching again. Additionally, this behavior might run afoul of document retention policies of an enterprise.

Therefore, examples of the disclosure can group multiple email messages, contacts, calendar items, or other data items in a client application based upon a grouping factor. A grouping factor can include a date or date range, a user group, a location, a tag, a folder or filter, or other parameters by which data items can be grouped. Examples of the disclosure can also render a user interface that displays the data items grouped according to the grouping factor and that allows the user to take an action on multiple messages that are grouped together at once.

For example, an email client according to the disclosure can group email messages according to a date or date range. In one scenario, emails received within the past week can be grouped together and emails received in the month prior to that can also be grouped together. Emails received prior to this month time period can also be grouped together on a monthly basis in the user interface. The email client can then allow the user, through a gesture or other command performed on an input device, to perform an action on all of the messages that are grouped together within the user interface. Therefore, in this scenario, the user can archive or delete emails received during a particular time period with a single command or gesture and without having to take any additional action or step to create the grouping of email messages. In other words, the email client groups the email messages together according to a grouping factor, which in this scenario is the date on which the email message was received in an email account of the user.

Figure 1:
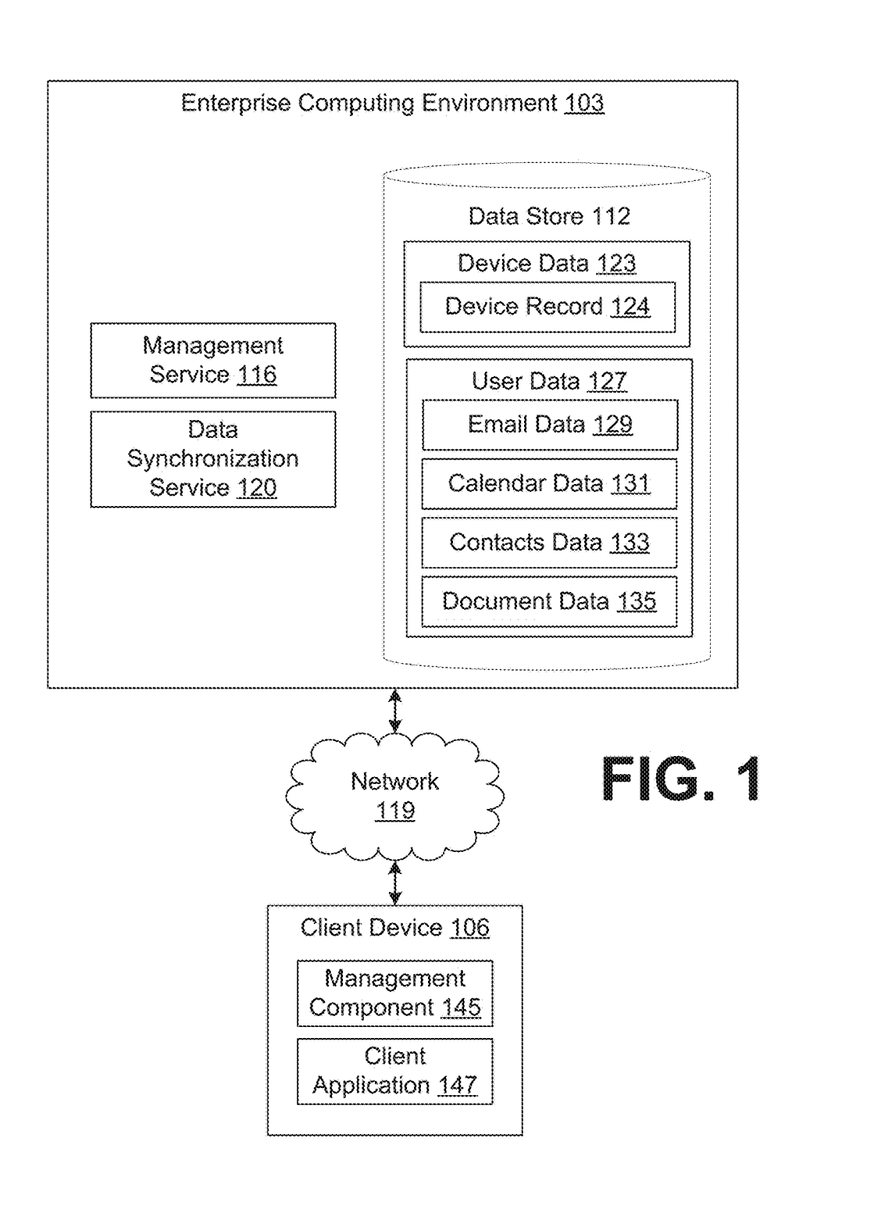
FIG. 1 is a schematic block diagram depicting an example implementation according to various examples of the disclosure.

FIG. 1 illustrates an example of a networked environment 100 according to examples of the disclosure. In the depicted network environment 100, an enterprise computing environment 103 is in communication with at least one client device 106 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, a data synchronization service 120, and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The data synchronization service 120 can represent a mail server, a server facilitating a file synchronization, calendar synchronization, contacts synchronization, or any combination thereof. In some examples, the enterprise computing environment 103 can execute separate servers that provide access to or synchronization of email, calendar data, contacts data, or document data, respectively.

The data synchronization service 120 can authenticate a user's access to email or other data corresponding to the user's account and provide data to one or more client applications 147 executed by the client device 106. The client applications 147 can facilitate access to the user's data in the data store 112. Additionally, in some examples, the data synchronization service 120 can determine whether to grant or deny access to the user data 127 from a client device 106 based upon whether the client device 106 is compliance with one or more compliance rules as determined by the management serviced 116 or a management component 145 executed by the client device 106.

The data stored in the data store 112 can include device data 123, user data 127, and potentially other data. Device data 123 can include device records 124 corresponding to client devices 106 that are enrolled as managed devices with the management service 116. A device record 124 within device data 123 can include various security settings selected for enforcement on a client device 106 that is enrolled with the management service 116. Accordingly, a device record 124 can include a device identifier associated with a device, such as the client device 106, one or more device certificates, and a compliance status. In some examples, device data 123 can also identify a user associated with a particular client device 106. A device record 124 can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 116 to report on its status. If a threshold amount of time has elapsed since the previous check-in of the client device 106, the device can be considered to have violated this compliance rule.

Another compliance rule can specify that a client device 106 be running one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

User data 127 contains information about users who are associated with client devices 106 that are enrolled with the management service 116. User data 127 can include profile information about a user, authentication information about a user, applications that are installed on client devices 106 associated with the user, and other user information. For example, user data 127 can include information about client devices 106 that are associated with a user account of the user, enterprise resources to which a particular user has access, such as email, calendar data, documents, media, applications, network sites, or other resources. The user data 127 can also identify one or more user groups of which a particular user is a member, which can in turn define the access rights of the user to one or more enterprise resources as well as identify which applications should be deployed to a client device 106 associated with the user. User data 127 can also identify a user's location or role within an organization. The user data 127 can further identify one or more device identifiers that can uniquely identify client devices 106 that are associated with a user account of the user.

User data 127 can also include email data 129, calendar data 131, contacts data 133, document data 135, or any other data that the data synchronization service 120 can synchronize with a client application 147 on a client device 106 on behalf of the user. Email data 129 can include email messages associated with a user account. Calendar data 131 can include data about calendar events, event invitations, or other data that can be rendered in a calendar application on the client device 106. The contacts data 133 can include information about contacts that can be rendered by a contacts application executed on the client device 106. Similarly, document data 135 can store files, documents, media, or other data that can be synchronized with or retrieved by a file synchronization application executed on the client device 106.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

In one example, the management service 116 can create a device record 124 for the client device 106 within the device data 123 and store it in the data store 112. The device record 124 can include data related to the management of the client device 106 by the management service 116. For example, the device record 124 can include one or more of: data describing the identity, type and components of the client device 106; data describing the state of the client device 106; data describing organizational groups to which the client device 106 belongs; data describing compliance rules with which the client device 106 must comply; data describing management policies that specify if, when and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 116), a device type of the client device (e.g., a smartphone, a tablet computing, a laptop computer, a desktop computer, a server computer, or a virtualized instance of any of such computer types), and various software and hardware components of the client device 106 (e.g., operating system (or kernel or bios) type and version, processor type and speed, memory type and size, network interface types, various I/O component types such as camera, touchscreen, keyboard, mouse, printer). More particularly, a device record 124 associated with a client device 106 comprising a network connection television can specify that the client device 106 is a device type of television, can specify that the client device 106 has a wireless network interface, and can specify that the client device 106 has an active connection to the Internet.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 116, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Next, data describing compliance rules with which the client device 106 must comply can, for instance, specify one or more remedial actions that should be performed in the event that an associated rule condition occurs, as described later herein. Further, data describing management policies can include permissions of the client device 106 (e.g., access rights) and settings that are being enforced upon the client device 106 (to control if, when and how the client device 106 is permitted to function). In some embodiments, the data describing compliance rules and the data describing management policies is obtained from an organizational record associated with an organizational group to which the client device 106 is a member (i.e., the compliance rules and management policies associated with the organizational group are reflected in the device record of the member client device 106).

Finally, the device record 124 can include data describing a command queue associated with the client device 106. For example, the management service 116 can maintain a command queue of commands that are designated for execution against the client device 106. As described herein, a client device 106 can be provisioned by the management service 116 by causing resources to be installed or stored on the client device 106. To implement such process, the management service 116 can store a command related to provisioning in the command queue. Additionally, the management service 116 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

One or more client applications 147 can be installed on the client device 106. As a managed device that is enrolled with the management service 116, some client applications 147 can be installed by the management service 116. In one scenario, the management service 116 can send a request to the management component 145 to retrieve and install a particular client application 147 on the client device 106. In this sense, installation of the application is initiated by the management service 116. However, enrolling the client device as a managed device and initiating installation of a client application 147 as a managed application is not a requirement for all examples of the disclosure.

The client application 147 can represent an email client, a calendar application, a contacts application, a document or file synchronization application, or any other application that can render content in a user interface that can be grouped according to a grouping factor. The client application 147 can allow a user to invoke a group user interface that groups content together according to the grouping factor. A grouping factor can include one or more time periods, a location of a user, a location of a sender, or a user group of a user or sender. For example, if the group user interface groups items by day and a particular email message was sent on a particular day, when a user invokes the group user interface, the client application 147 displays the email grouped together with other emails that were sent on the same day. A grouping factor can also include a tag or a folder assigned to a particular data item. In one scenario, an email client can automatically tag or assign folders to an incoming email based upon rules that are set up by a user.

If the grouping factor is a location of the sender, the group user interface that display emails grouped together with emails sent from other users associated with the same location. For example, in an enterprise environment, users of the enterprise can be associated with a user group that specifies their location, such as a physical office location of the enterprise to which the user is assigned. Accordingly, if the grouping factor is this location, the client application 147 can group emails sent from users associated with a particular physical office location together within the group user interface. In another scenario, the grouping factor can be a user group in a directory service, such as an ACTIVE DIRECTORY environment. In this example, emails sent by users assigned to a particular group with the directory service can be grouped together within the group user interface. In some scenarios, a sender might be assigned to multiple user groups. Accordingly, such a user would be represented in the various groupings presented within the group user interface.

The principles of grouping data items together within a group user interface can also be applied to a client application 147 that is a calendar application, a file browser or file viewer, a contacts application, or any other application in which data items can be viewed and grouped together.

Figure 2:
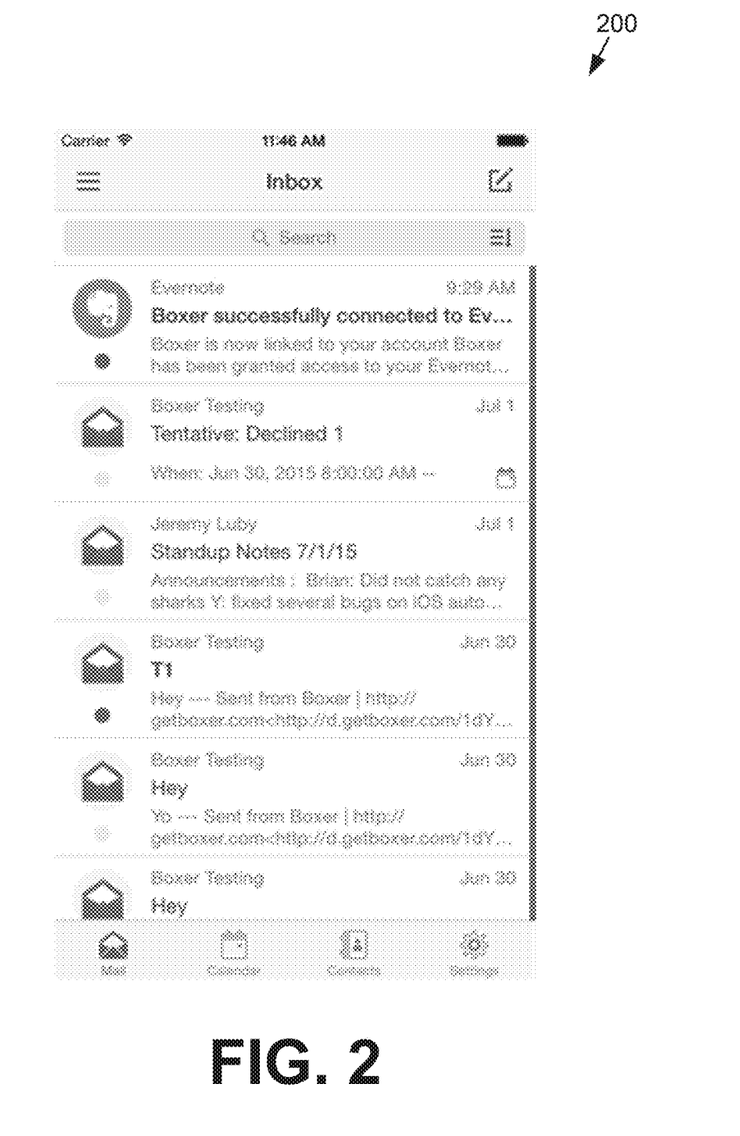
FIG. 2 is an example user interface according to one example of the disclosure.

Referring next to FIG. 2, shown is an example user interface 200 rendered by a client application 147 according to one example of the disclosure. The user interface 200 shown in FIG. 2 is an inbox user interface of an email client that the client device 106 can execute to view, compose and otherwise manage email obtained from the data synchronization service 120 or any other mail server. The user interface of the client application 147 shown in FIG. 2 is a view of a user's email inbox but can also represent a view of another folder within a user's mailbox. The user interface 200 contains a visual reference to at least a subset of emails obtained from the data synchronization service 120. In other examples, the user interface can also represent a view of a user's calendar, which can include representations of meetings and/or appointments that are shown in a representation of a day, week, month or year of a calendar. In the user interface of FIG. 2, the user might wish to view the emails associated with his or her account grouped together according to a grouping factor.

The client application 147 can allow a user to select a grouping factor in a configuration option or might be preconfigured with a particular grouping factor. For illustrative purposes, the grouping factor shown in the following user interface examples is a time period. In other words, the emails represented in the user interface examples are grouped according to a timestamp of when they were sent by a sender of the email. However, other grouping factors can be selected with which to group emails together in a group user interface.

Figure 3:
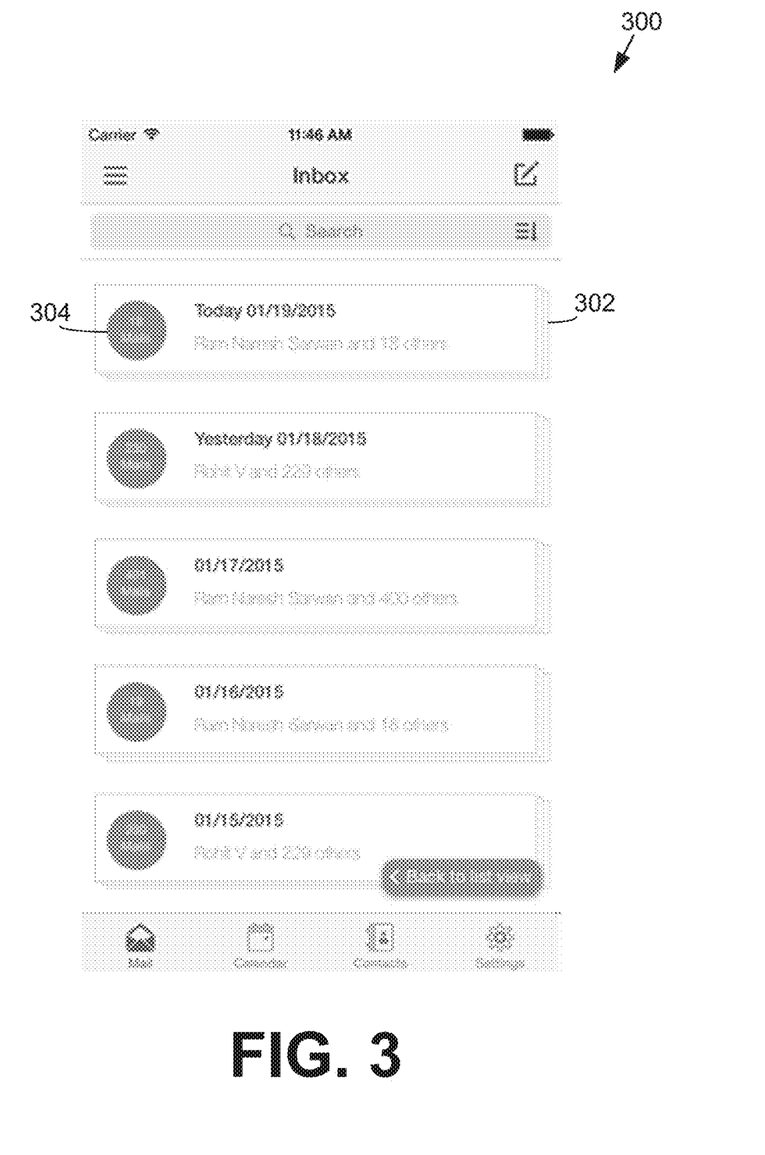
FIG. 3 is an example user interface according to one example of the disclosure.

Referring next to FIG. 3, shown is an example of a group user interface 300 according to examples of the disclosure. In the group user interface 300, emails are grouped together according to a grouping factor. In the example of FIG. 3, the grouping factor is the time or date on which an email was sent by a sender. The grouping factor could also be a time or date on which the email was received by the email client or by the data synchronization service 120. The email messages shown in the user interface are grouped by the client application 147 into various groupings, such as grouping 302. The groupings separate the emails into groups according to the grouping factor, which is the illustrated scenario is a date on which the email was received by the client application 147. In one example, the group user interface 300 can be invoked by the user when the client application 147 detects a particular gesture in the user interface 200 shown in FIG. 2. For example, a zoom-out, a reverse pinch, or an un-pinch gesture from the user interface 200 can cause the group user interface 300 to be invoked.

The groupings shown in the group user interface 300 can also include an indicator 304 that indicates a number of data items, such as emails, that are grouped together. In the depicted example, indicator 304 indicates that 18 emails are grouped together in the grouping 302. The grouping 302 can also indicate that the grouping factor defining the group. For example, the grouping factor defining the grouping 302 is a particular date. In some examples, despite the groupings displayed in the group user interface 300 of FIG. 3, a user might desire less granularity in the groupings that are displayed in the user interface. In other words, the user might desire more messages to be grouped together into groupings. Accordingly, the client application 147 can allow the user to invoke another group user interface 400, shown in FIG. 4, from the group user interface 300 of FIG. 3.

Figure 4:
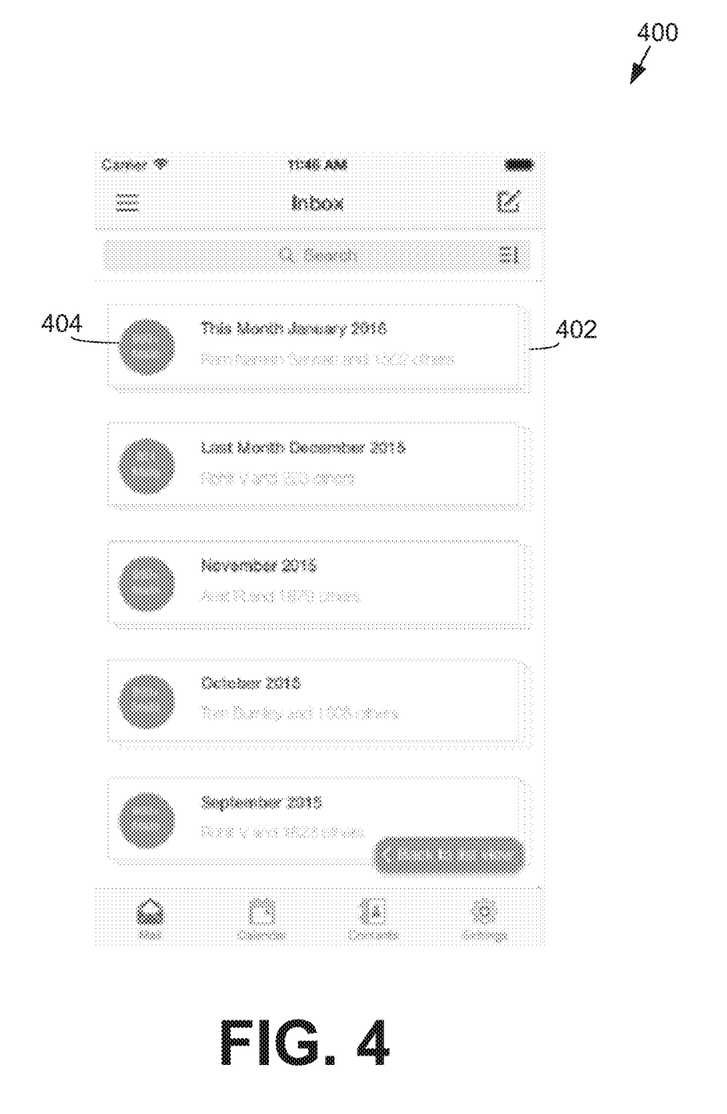
FIG. 4 is an example user interface according to one example of the disclosure.

Therefore, reference is now made to FIG. 4, which illustrates an example of a group user interface 400 that can be generated in response to a gesture performing a particular gesture in the group user interface 300 of FIG. 3. The gesture can be an un-pinch, zoom-out, or reverse pinch gesture. In the group user interface 400, the client application 147 can group the data items, such as email messages in the case of FIG. 4, on a less granular level than in the case of FIG. 3. In other words, the email messages are grouped into larger groupings that have a larger date range. As shown in the example of FIG. 4, email messages sent within a particular month are grouped together whereas in the example of FIG. 3, the email messages are grouped together by day. In this way, a user can view groupings or emails or other data items, such as grouping 402, that are grouped together with even less granularity than the example of FIG. 3. In the example of FIG. 4, the email messages are grouped together if they were received within the same month.

In one example, the client application 147 can detect a zoom-in gesture, or a pinch gesture, in the group user interface 400, which causes the client application 147 to invoke the group user interface 300 of FIG. 3. The client application 147 can also detect an additional zoom-out gesture, or un-pinch gesture, can cause the client application 147 to generate another group user interface where the email messages are grouped together in larger groupings than in group user interface 400. In this way, the user can effectively zoom-in or zoom-out to adjust the level of granularity or size of the groupings into which data items are grouped in the group user interface 400.

The same principles of grouping items together can be applied in scenarios where the grouping factor is a location or group or the sender or any other grouping factor. For example, in a first group user interface, emails sent from users in a particular city can be grouped together. In a second group user interface with less granularity, emails sent from users in a particular state or region can be grouped together. In a subsequent third group user interface, emails from users in a particular country can be grouped together, and so on.

In some examples, the email messages, or data items, can be grouped together such that more recent email messages are grouped together with more granularity and email messages that are further removed from the current time or day are grouped together with less granularity. In other words, emails received within the past day can be grouped together into a grouping, emails received within the week previous to that day can be grouped together, emails received within the month prior to that previous week are grouped together into a grouping, and so on.

Within a group user interface 400, the client application 147 can perform bulk actions on groupings of data items, such as email messages. Therefore, reference is now made to FIG. 5, which illustrates an example. In the group user interface 500 of FIG. 5, the client application 147 can detect a particular gesture, such as a swipe gesture, that is performed on one of the groupings, such as grouping 502. Upon detecting a specific gesture performed on one of the groupings, the client application 147 can perform a specified action on all of the data items, such as email messages, that are within the grouping. For example, the client application 147 can archive or delete all of the messages within the grouping. As another example, the client application 147 can flag the messages, placed them within a particular folder, tag the messages, forward the messages to a designated contact, or send a specified reply email to all of the messages within the grouping.

Figure 5:
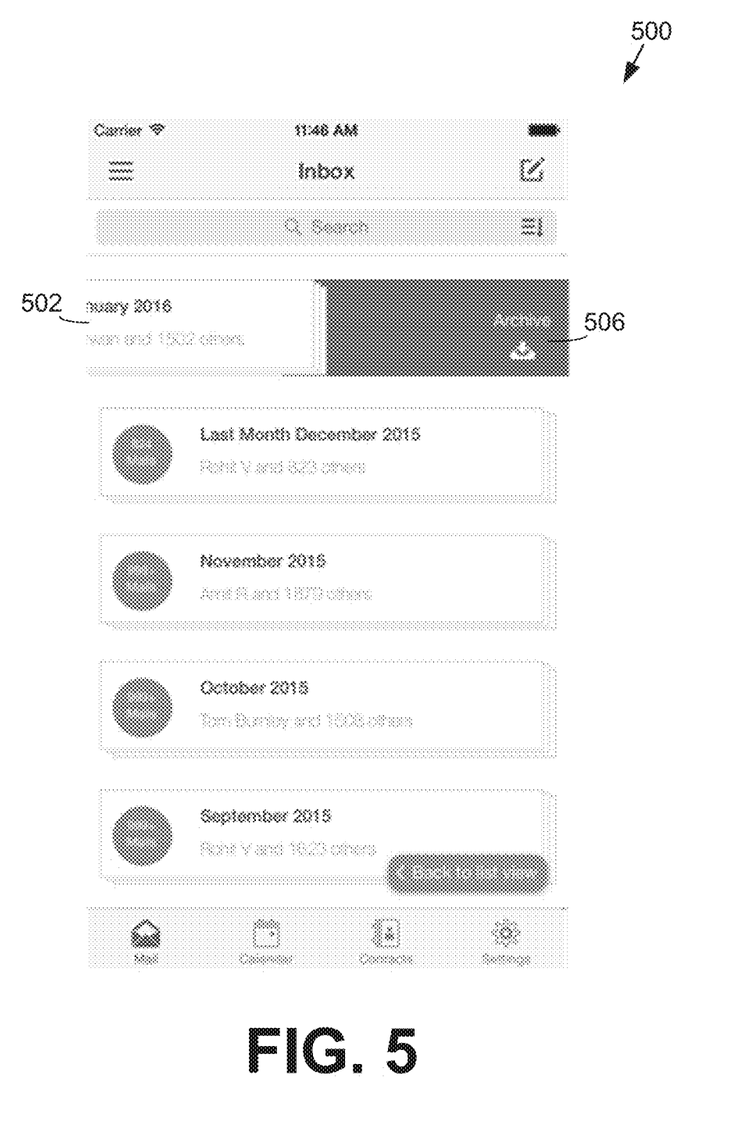
FIG. 5 is an example user interface according to one example of the disclosure.

Additionally, the client application can generate an animation, such as a sliding animation, so that the grouping 502 moves according to the gesture. Additionally, when the particular gesture is detected, the client application 147 can also generate an indicator 506 that identifies the particular action that will be taken with respect to the email messages once the gesture is completed. In one example, the client application 147 can require the user to swipe the grouping 502 past a threshold coordinate in the X or Y directions before performing the bulk action identified by the indicator 506 on all of the email messages in the grouping.

Figure 6:
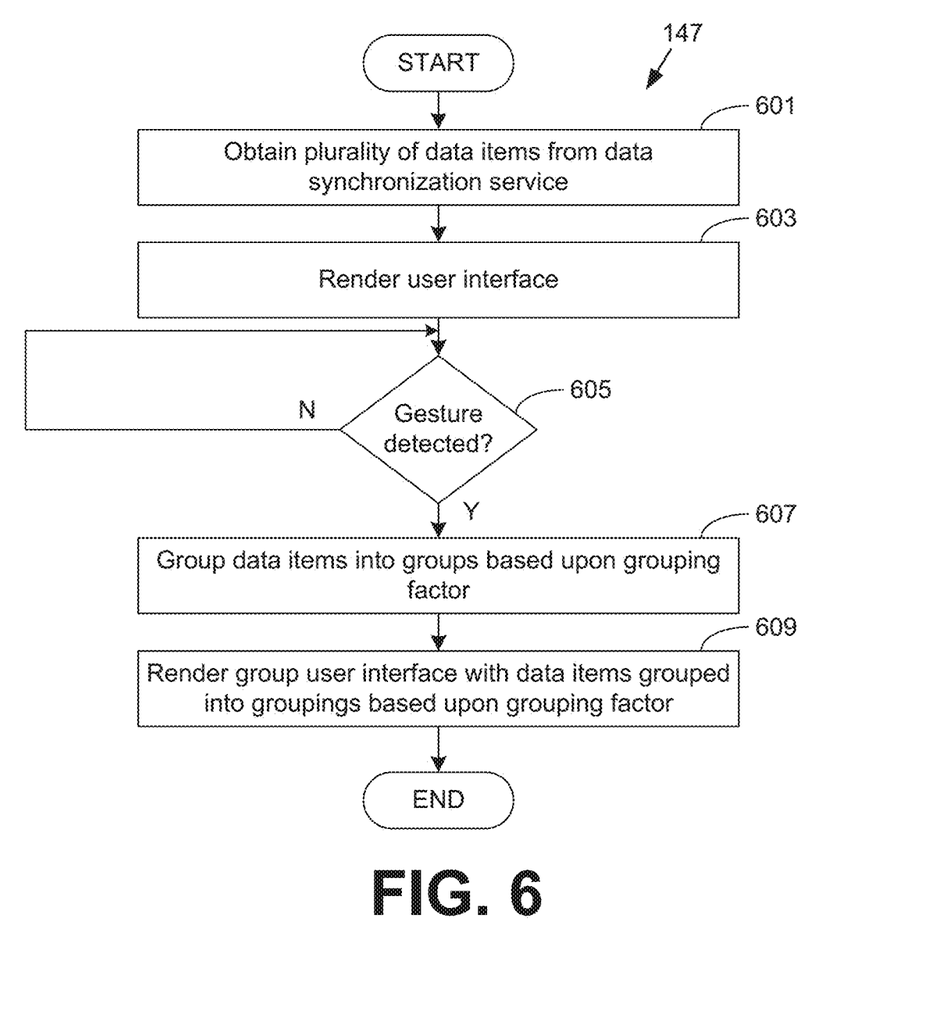
FIG. 6 is a flowchart that illustrates functionality according to a first example of the disclosure.

Referring next to FIG. 6, shown is a flowchart that provides one example of how the client application 147 can generate a group user interface that groups data items, such as email messages in an email client, together into groupings.

First, at step 601, the client application 147 can obtain a plurality of data items, such as email messages, calendar events, contacts, files, or other data items, from the data synchronization service 120. In some examples, the data items can be stored locally on the client device 106 and represent locally stored data or files. At step 603, the client application 147 can render a user interface in which at least a subset of the data items obtained from the data synchronization service 120 are displayed. The user interface can include a visual reference to each of the data items within the user interface. In some examples, the user interface can allow the user to scroll or otherwise navigate through the data items obtained from the data synchronization service 120. In one example, the user interface can display a user's email inbox.

At step 605, the client application 147 can determine whether a particular gesture, such as an un-pinch or zoom out gesture, that invokes the group user interface is detected. The gesture can be detected from a touch user interface, such as a touchscreen device, or an external input device, such as a trackpad, keyboard or other input device. If the gesture is not detected, the process can continue gesture detection until the particular gesture is detected.

Once the particular gesture is detected that invokes the group user interface, the process can proceed to step 607, where the client application 147 groups the data items obtained from the data synchronization service 120 according to the grouping factor. As noted above, the grouping factor can represent a fixed or variable time period, a location of a sender, a user group of the sender, a location of an event associated with a calendar event, a value associated with a contact, or any other aspect of a file, contact, calendar event, or email message. At step 609, the client application 147 can render the group user interface in which data items are grouped into various groupings according to the grouping factor. Thereafter, the process proceeds to completion.

Figure 7:
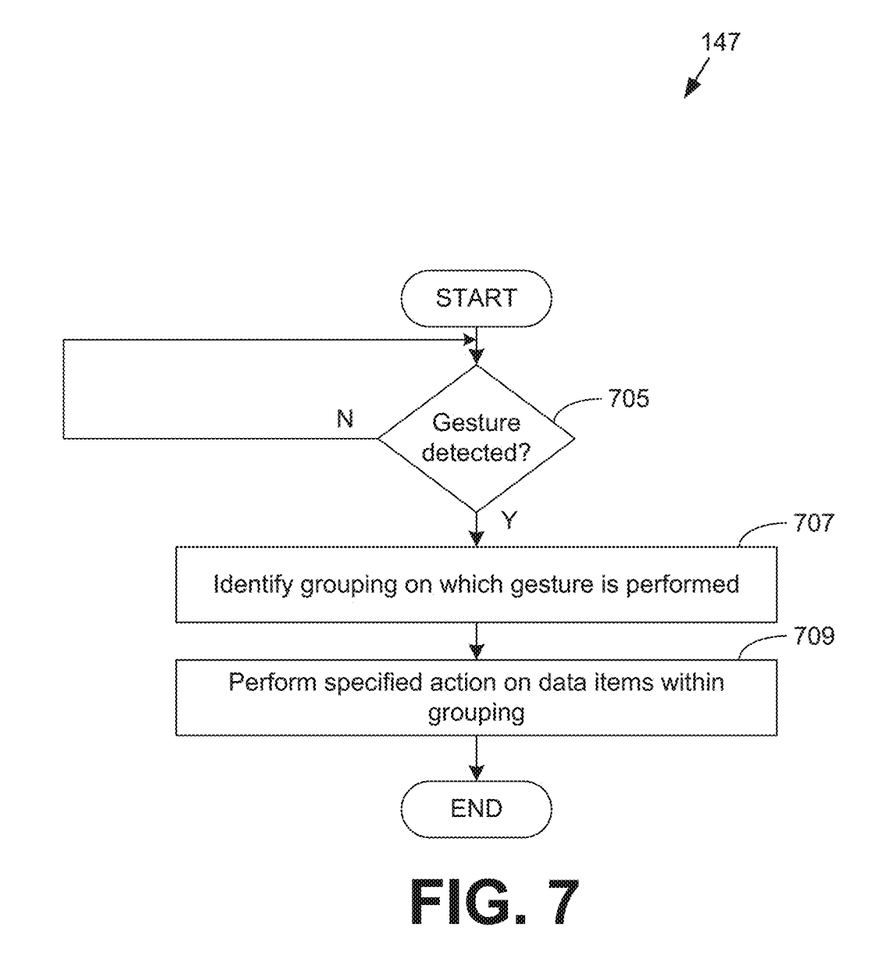
FIG. 7 is a flowchart that illustrates functionality according to a second example of the disclosure.

Referring next to FIG. 7, shown is a flowchart that provides one example of how the client application 147 perform a bulk action on various items that are grouped together within a grouping within a group user interface. The bulk action can be performed to a grouping of data items, such as email messages in an email client, together into groupings.

First, at step 705, the client application 147 can determine whether a particular gesture, such as swipe gesture, that invokes a bulk action on a grouping within a group user interface is detected. The gesture can be detected from a touch user interface, such as a touchscreen device, or an external input device, such as a trackpad, keyboard or other input device. If the gesture is not detected, the process can continue gesture detection until the gesture is detected.

Once the particular gesture is detected that invokes the group user interface, the process can proceed to step 607, where the client application 147 identifies a grouping within the group user interface on which the gesture is performed. In some examples, the client application 147 can also display an indication of the particular gesture that is to be performed on the data items within the grouping. At step 709, the client application 147 can perform the action on each of the data items within the grouping. Therefore, the process proceeds to completion.

The flowcharts of FIGS. 6-7 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 6-7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, data synchronization service 120, and other components described herein can be embodied in the form of hardware, as software components that are executable by hardware, or as a combination of software and hardware.

If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

I claim:

1. A system for displaying email messages, comprising:
a client device comprising a processor and a memory; and a client application executable by the client device, the client application causing the client device to at least:
obtain a selection of a grouping factor from a plurality of available grouping factors;
obtain a plurality of emails associated with a user account from an email server;
place at least a subset of the plurality of emails in an inbox user interface, wherein the inbox user interface displays a visual reference to each of the at least a subset of the plurality of emails;
detect a zoom-out gesture from an input device associated with the client device;
in response to detection of the zoom-out gesture, group each of the emails into one or more groups of emails based on whether each of the emails shares a common value for the grouping factor for the one or more groups of emails; and
render a group user interface, the group user interface depicting the groups of emails, each group of emails sharing the common value for the grouping factor.

2. The system of claim 1, wherein the grouping factor comprises at least one time period.

3. The system of claim 2, wherein the at least one time period comprises a first time period corresponding to a most recent time period and at least one other time period corresponding to at least one earlier time period, wherein the most recent time period is smaller than the at least one earlier time period.

4. The system of claim 3, wherein the at least one earlier time period comprises a plurality of time periods and a respective size of each of the plurality of time periods is larger the more temporally removed from the most recent time period.

5. The system of claim 1, wherein the grouping factor comprises a tag associated with respective ones of the plurality of email messages, a user group of a sender of respective ones of the plurality of email messages, or a location of a sender of respective ones of the plurality of email messages.

6. The system of claim 1, wherein the client application further causes the client device to at least:
detect a swipe gesture on one of the respective groups;
generate a sliding animation on the one of the respective groups in response to detecting the swipe gesture;
display an icon indicating a bulk action within the sliding animation; and
perform the bulk action on a respective plurality of emails corresponding to the one of the respective groups.

7. The system of claim 6, wherein the particular action comprises at least one of an archiving of the respective plurality of emails or deletion of the respective plurality of emails.

8. The system of claim 1, wherein the zoom-out gesture is a first zoom-out gesture and the client application causes the client device to at least:
detect a second zoom-out gesture on the group user interface subsequent to detection of the first zoom-out gesture;
select a less granular grouping factor in response to detection of the second zoom-out gesture;
group the other subset of the plurality of emails according to the less granular grouping factor; and
render the group user interface in which the other subset of the plurality of emails is depicted in respective groups according to the less granular grouping factor.

9. A method for displaying emails on a client device, comprising:
obtaining a selection of a grouping factor from a plurality of available grouping factors;
obtaining a plurality of emails associated with a user account from an email server;
placing at least a subset of the plurality of emails in an inbox user interface, wherein the inbox user interface displays a visual reference to each of the at least a subset of the plurality of emails;
detecting a zoom-out gesture from an input device associated with the client device;
in response to detecting the zoom-out gesture, grouping each of the emails into one or more groups of emails based on whether each of the emails shares a common value for the grouping factor for the one or more of the groups of emails; and
rendering a group user interface, the group user interface depicting the groups of emails, each group of emails sharing the common value for the grouping factor.

10. The method of claim 9, wherein the grouping factor comprises at least one time period.

11. The method of claim 10, wherein the at least one time period comprises a first time period corresponding to a most recent time period and at least one other time period corresponding to at least one earlier time period, wherein the most recent time period is smaller than the at least one earlier time period.

12. The method of claim 11, wherein the at least one earlier time period comprises a plurality of time periods and a respective size of each of the plurality of time periods is larger the more temporally removed from the most recent time period.

13. The method of claim 9, wherein the grouping factor comprises a tag associated with respective ones of the plurality of email messages, a user group of a sender of respective ones of the plurality of email messages, or a location of a sender of respective ones of the plurality of email messages.

14. The method of claim 9, further comprising:
detecting a swipe gesture on one of the respective groups;
generating a sliding animation on the one of the respective groups in response to detecting the swipe gesture;
displaying an icon indicating a bulk action within the sliding animation; and
performing the bulk action on a respective plurality of emails corresponding to the one of the respective groups, wherein the bulk action comprises at least one of an archiving of the respective plurality of emails or deletion of the respective plurality of emails.

15. The method of claim 14, wherein the particular action comprises at least one of an archiving of the respective plurality of emails or deletion of the respective plurality of emails.

16. The method of claim 9, wherein the zoom-out gesture is a first zoom-out gesture and the method further comprises:
detecting a second zoom-out gesture on the group user interface subsequent to detection of the first zoom-out gesture;
selecting a less granular grouping factor in response to detection of the second zoom-out gesture;
grouping the other subset of the plurality of emails according to the less granular grouping factor; and
rendering the group user interface in which the other subset of the plurality of emails is depicted in respective groups according to the less granular grouping factor.

17. A non-transitory computer-readable medium comprising machine-readable instructions for displaying email messages on a client device, wherein when executed by a processor of the client device, the machine-readable instructions cause the client device to at least:

obtain a selection of a grouping factor from a plurality of available grouping factors;

obtain a plurality of emails associated with a user account from an email server;

place at least a subset of the plurality of emails in an inbox user interface, wherein the inbox user interface displays a visual reference to each of the at least a subset of the plurality of emails;

detect a zoom-out gesture from an input device associated with the client device;

in response to detection of the zoom-out gesture, group each of the emails into one or more groups of emails based on whether each of the emails shares a common value for the grouping factor for the groups of emails; and render a group user interface, the group user interface depicting the groups of emails, each group of emails sharing the common value for the grouping factor.

18. The non-transitory computer-readable medium of claim 17, wherein the grouping factor comprises at least one time period.

19. The non-transitory computer-readable medium of claim 18, wherein the at least one time period comprises a first time period corresponding to a most recent time period and at least one other time period corresponding to at least one earlier time period, wherein the most recent time period is smaller than the at least one earlier time period.

20. The non-transitory computer-readable medium of claim 19, wherein the at least one earlier time period comprises a plurality of time periods and a respective size of each of the plurality of time periods is larger the more temporally removed from the most recent time period.

21. The non-transitory computer-readable medium of claim 17, wherein the grouping factor comprises a tag associated with respective ones of the plurality of email messages, a user group of a sender of respective ones of the plurality of email messages, or a location of a sender of respective ones of the plurality of email messages.

22. The non-transitory computer-readable medium of claim 17, the machine-readable instructions further causing the client device to at least:

detecting a swipe gesture on one of the respective groups;

generating a sliding animation on the one of the respective groups in response to detecting the swipe gesture;

displaying an icon indicating a bulk action within the sliding animation; and performing the bulk action on a respective plurality of emails corresponding to the one of the respective groups, wherein the bulk action comprises at least one of an archiving of the respective plurality of emails or deletion of the respective plurality of emails.

23. The non-transitory computer-readable medium of claim 17, wherein the zoom-out gesture is a first zoom-out gesture and the machine readable instructions cause the client device to at least:

detect a second zoom-out gesture on the group user interface subsequent to detection of the first zoom-out gesture;

select a less granular grouping factor in response to detection of the second zoom-out gesture;

group the other subset of the plurality of emails according to the less granular grouping factor; and render the group user interface in which the other subset of the plurality of emails is depicted in respective groups according to the less granular grouping factor.

* * * * *